UNITED STATES PATENT OFFICE.

CHARLES MARCHAND, OF KIMBERLY, WISCONSIN; MARIE L. MARCHAND, ADMINISTRATRIX OF SAID CHARLES MARCHAND, DECEASED, ASSIGNOR TO THE MARCHAND PROCESS COMPANY, OF CHICAGO, ILLINOIS, A CORPORATION OF ILLINOIS.

PROCESS OF TREATING LIQUORS FROM WOOD-PULP SULFITE PLANTS.

1,253,854.     Specification of Letters Patent.     Patented Jan. 15, 1918.

No Drawing. Application filed August 14, 1916, Serial No. 114,838. Renewed November 19, 1917. Serial No. 202,887.

*To all whom it may concern:*

Be it known that I, CHARLES MARCHAND, a citizen of the United States, residing at Kimberly, in the county of Outagamie and State of Wisconsin, have invented certain new and useful Improvements in Processes of Treating Liquors from Wood-Pulp Sulfite Plants; and I do hereby declare the following to be a full, clear, and exact description of the invention, such as will enable others, skilled in the art to which it appertains to make and use the same.

This invention relates to the treatment of by-product residues from wood-pulp sulfite plants, and has for an object to conserve and utilize the organic matter, dextrose and mineral compounds contained therein, so that practically no valuable or deleterious material will be run into the streams, thus solving at great financial profit the question of pollution of the rivers, which has been and is still the cause of great loss in the fish industry.

It is well known that in wood-pulp sulfite treatment a by-product liquor is produced containing varying quantities of free sulfur dioxid, calcium sulfite, magnesium sulfite and organic compounds amounting to about 10% by weight.

These substances, as will be perfectly apparent, are highly poisonous to fish resident within the waters in which such by-product liquor is now usually discharged, and the present invention comprehends the recovering and utilizing of the calcium and magnesium salts, the organic substances and the dextrose or other sugars also present in such by-product.

According to the present process, the sulfur dioxid is set free and the several sulfites are converted to their corresponding chlorids by the addition, during agitation, of a slight excess of hydrochloric acid. Other strong mineral acids such as phosphoric acid, nitric acid or sulfuric acid can be used to set free the sulfur dioxid, but owing to the fact that the salts resulting from the use of the above-named acids interfere seriously with the carrying out of the process from a mechanical standpoint, hydrochloric acid seems at the present time to be the only acid which gives results practical in every aspect. The reaction which takes place from the use of the hydrochloric acid is as follows:

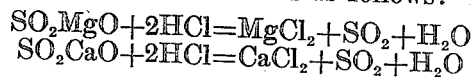

$$SO_2MgO + 2HCl = MgCl_2 + SO_2 + H_2O$$
$$SO_2CaO + 2HCl = CaCl_2 + SO_2 + H_2O$$

In practice, ten thousand (10,000) liters or more of the original by-product liquor may be run into a tank with suitable agitating devices, and an analysis made.

Assuming that the analysis shows for instance: Combined sulfur dioxid 0.80 per cent. in the form of calcium sulfite and magnesium sulfite, both of these sulfites are converted in their corresponding chlorids by the addition thereto of a slight excess of 18° Baumé hydrochloric acid, the reaction being as above.

As shown in the foregoing equation, the addition of hydrochloric acid converts the sulfites into chlorids, the sulfur dioxid is then eliminated by vaporization, preferably under vacuum, and can be recovered and conserved by any usual and well-known process of recovering acids from their diluting liquors.

Recent experiments have demonstrated that all the free sulfur dioxid contained in the above treated liquor, except 1/30000 part, can be easily removed by vaporization under vacuum, whereas further experiments have demonstrated that the presence of so small a percentage of sulfur dioxid does not interfere at all with the subsequent steps of the process.

After such treatment, a portion of the excess of hydrochloric acid is neutralized by the addition of either lime or magnesite, which form soluble chlorids, so as to leave the liquor slightly acid from 5/1000 normal to about 1/10 normal, or in other words, 100 c. c. of the liquor will need from 1/2 c. c. to c. c. normal sodium hydrate solution for neutralizing, using phenolphthalein for indicator.

The treated liquor is then permitted to stand in the tank so as to allow the particles of either lime or magnesite which may be present to settle, and the clear liquor can be drawn off.

The liquor thus drawn off contains from 3 to 6% of dextrose and other sugars, which are submitted to the ordinary of fermentation, and the ethyl alcohol produced by such fermentation is distilled off in the usual manner.

The mash, after distillation of the alcohol, contains about 19% of solid substance constituted of organic and mineral compounds of which the fuel value is from 735 B. T. U. to 825 B. T. U.

Therefore the following step of the present process consists in a subsequent evaporation of the mass which produces about 380 lbs. of dry material per ton of evaporated liquor which contains both the magnesium and calcium chlorids plus some lignone and other organic compounds.

This dry material after being burnt, leaves 1 to 2% of ashes which contain 40 to 50% of magnesium chlorid plus 20 to 30% of calcium chlorid.

The ashes being treated by hot water will give a solution containing both chlorids of which the respective solubility in water is as follows:

Magnesium chlorid, in 100 parts cold water 52.2 parts and in hot water 65.87 parts.

Calcium chlorid, in 100 parts of cold water 59.5 parts and in hot water—100° C.—156 parts.

Owing to the great difference in the degree of solubility of these two salts they can be separated by repeated crystallizations so as to obtain marketable calcium chlorid and magnesium chlorid which have a high commercial value.

Therefore, by employing the above-described process at sulfite plants it is obvious that the pollution of the rivers will be absolutely removed at an immense financial profit to the wood sulfite mills.

What I claim is:

1. The process of detoxicating liquors from wood sulfite plants and recovering the valuable by-products therein consisting in converting the sulfites to their corresponding chlorids and sulfur dioxid, expelling the sulfur dioxid, fermenting the residue, and distilling off the alcohol.

2. The process of detoxicating liquors from wood-pulp sulfite plants and recovering the valuable by-products therefrom consisting in converting the sulfites to their corresponding chlorids and sulfur dioxid, expelling the sulfur dioxid, fermenting the residue, distilling off the alcohol from such fermentation, evaporating the liquid from the residuary mash, burning the solid residue, and recovering the chlorids by repeated crystallizing.

3. The process of detoxicating liquors from wood-pulp sulfite plants and recovering the valuable by-products consisting in converting the sulfites to their corresponding chlorids and sulfur dioxid, expelling the sulfur dioxid, fermenting the residue, distilling off the alcohol, removing the moisture from the residuary mash, burning the residue, treating the ash with water, and separately crystallizing out the different chlorids by repeated crystallizing.

4. The process of detoxicating liquors from wood-pulp sulfite plants consisting in converting the sulfites to their corresponding chlorids and sulfur dioxid, expelling the sulfur dioxid, fermenting and expelling the alcohol, and evaporating to produce a fuel containing the said chlorids.

5. The process of detoxicating liquors liquors from wood-pulp sulfite plants and recovering the valuable by-products therefrom consisting in converting the sulfites to their corresponding chlorids and sulfur dioxid, expelling the sulfur dioxid, fermenting and expelling the alcohol, evaporating the mass to produce a fuel containing the said chlorids, and reducing the said fuel to an ash containing the said chlorids in water soluble form.

In testimony whereof I affix my signature in presence of two witnesses.

CHARLES MARCHAND.

Witnesses:
 HENRY A. ROTHCHILD,
 LE ROY H. HUNTLEY.